Oct. 5, 1948.  G. M. RICHARD  2,450,688
MEAT TENDERIZING MACHINE
Filed Oct. 11, 1944  4 Sheets-Sheet 1
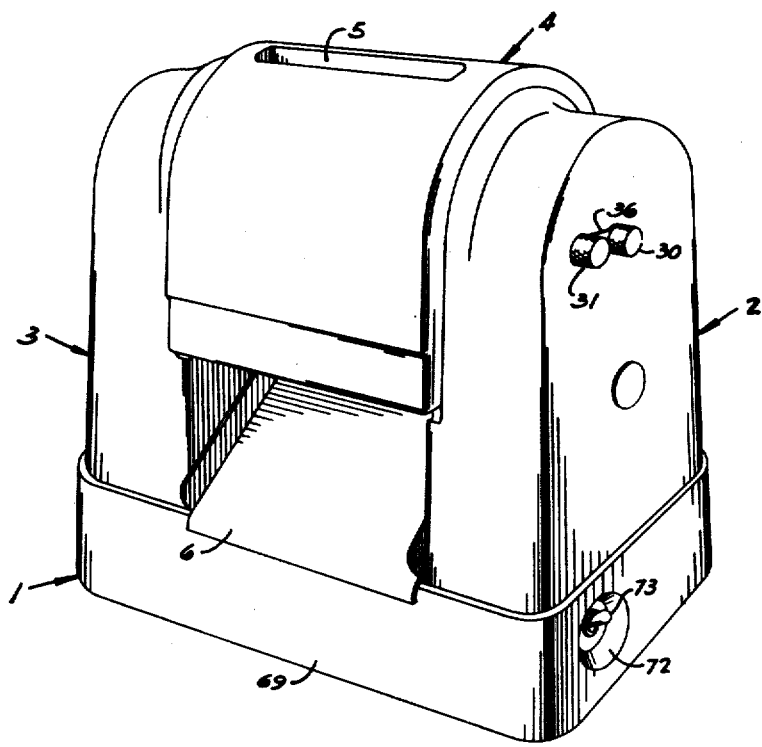
Fig. I
INVENTOR.
Grant M. Richard
BY
Marshall & Marshall
ATTORNEYS

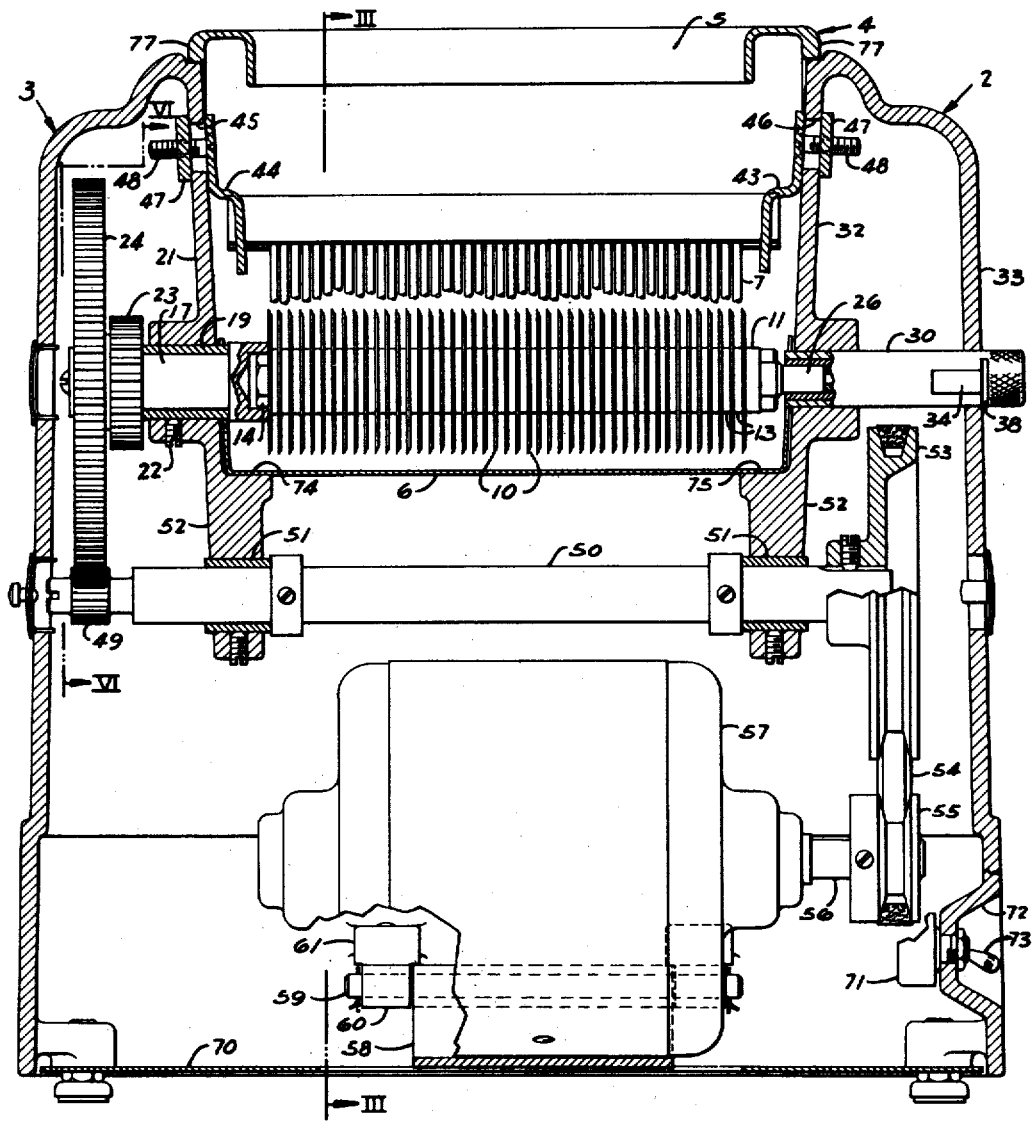
Fig. II

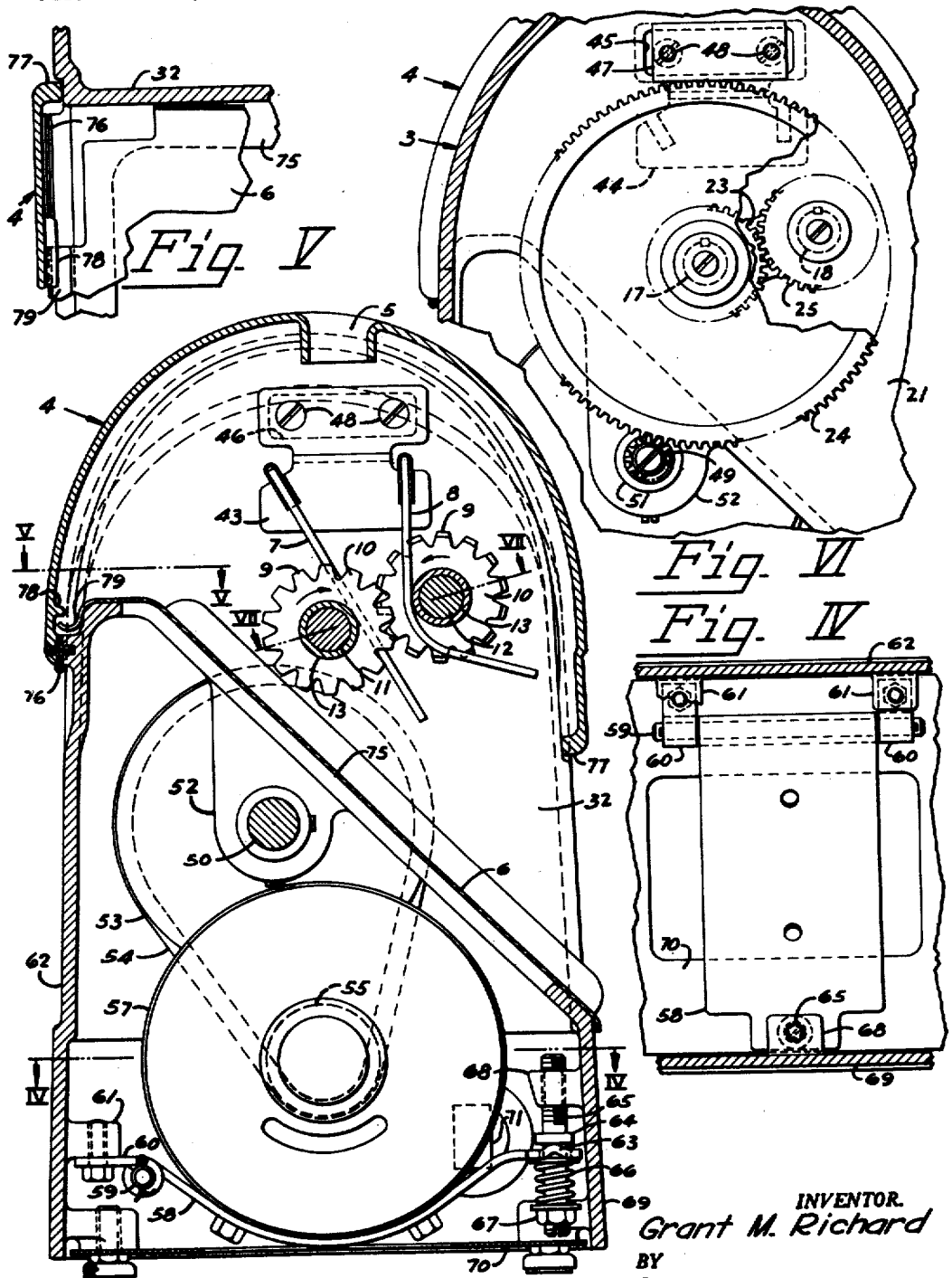

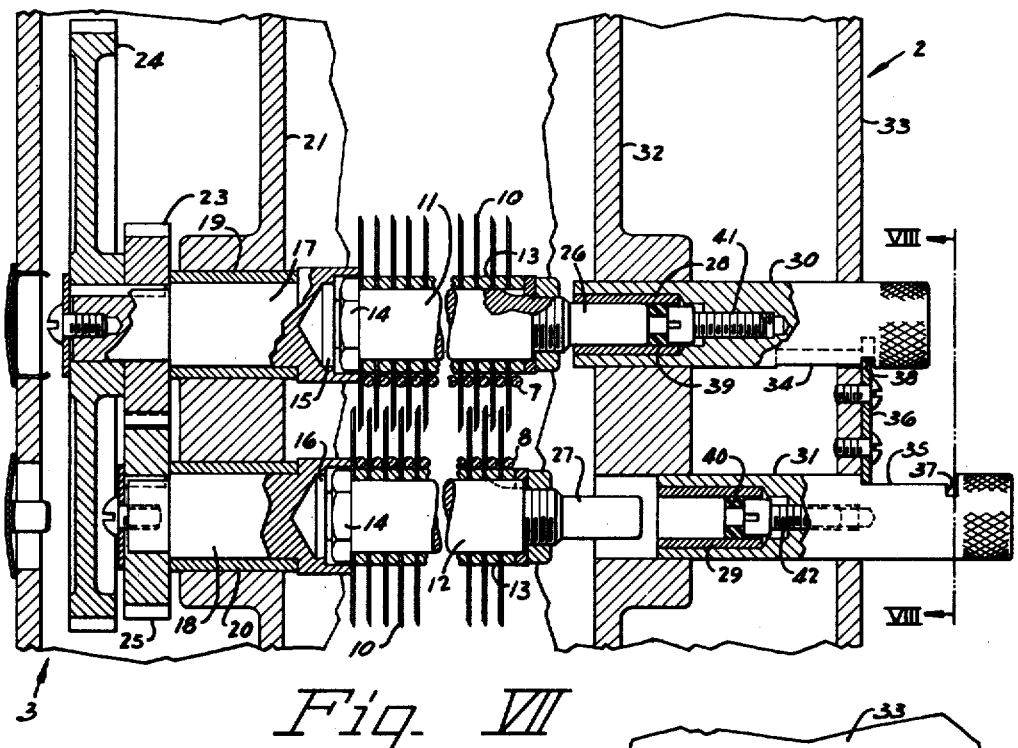
Fig. VII
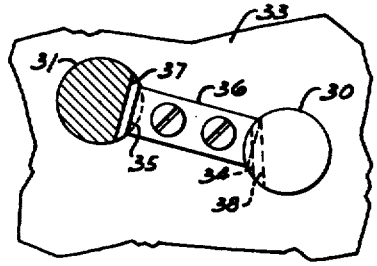
Fig. VIII
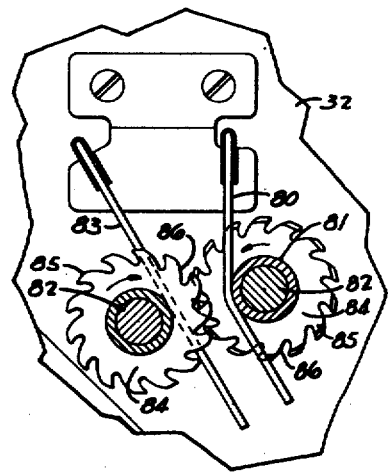
Fig. IX
INVENTOR.
Grant M. Richard
BY
Marshall & Marshall
ATTORNEYS Patented Oct. 5, 1948

2,450,688

UNITED STATES PATENT OFFICE 2,450,688

MEAT TENDERIZING MACHINE

Grant M. Richard, Toledo, Ohio, assignor to Toledo Scale Company, Toledo, Ohio, a corporation of New Jersey Application October 11, 1944, Serial No. 558,138

7 Claims. (Cl. 17—26)

This invention relates to meat tenderizing machines in which the meat is tenderized by passing it between a plurality of knives mounted on a pair of rotating arbors. The invention relates particularly to an arrangement of parts such that, within a given amount of space, the parts are all easily accessible for inspection or servicing. One of the principal aims of a designer of machines for tenderizing meat is to keep the machine as small as possible consistent with a given operating capacity. In an attempt to obtain this result many of the machines have been designed with their working parts crowded into a portion of the housing so that they are very difficult to service, inspect or adjust.

An object of this invention is to provide a meat tenderizing machine in which the moving parts are distributed within the frame of the machine so as to provide maximum accessibility.

Another object is to provide a hinged mounting for a driving motor of a meat tenderizing machine so arranged that the motor may be swung to a position completely outside the frame of the machine.

Another object of the invention is to provide automatic belt tension adjustment by mounting the free end of the hinge supporting the motor between a spring and an adjustable stop.

It is another object of the invention to provide means for clamping comb supporting brackets to the frame of a meat tenderizing machine so that the brackets present a substantially smooth exterior and are easily cleaned.

A still further object is to provide the frame of a meat tenderizing machine with a recess in which a switch for controlling the operation of the machine may be located.

These and other objects and advantages are apparent from the following description in which reference is had to the accompanying drawings.

In the drawings:

Figure I is a perspective view of a meat tenderizing machine embodying the invention.

Figure II is a vertical section taken parallel to the knife-carrying arbors.

Figure III is a vertical section taken perpendicular to the knife-carrying arbors substantially along the line III—III of Figure II.

Figure IV is a horizontal section taken substantially along the line IV—IV of Figure III.

Figure V is a horizontal section taken substantially along the line V—V of Figure III.

Figure VI is a fragmentary end elevation taken substantially along the line VI—VI of Figure II.

Figure VII is a sectional view taken through the axes of the knife-carrying arbors substantially along the line VII—VII of Figure III.

Figure VIII is a fragmentary end elevation of the arbor retaining means and is taken substantially along the line VIII—VIII of Figure VII.

Figure IX is a fragmentary end elevation showing an alternative form of knife and comb.

These specific drawings and the specific description that follows merely disclose and illustrate the invention and are not intended to impose limitations upon the claims.

A meat tenderizing machine embodying the invention comprises a hollow generally rectangular box-like base 1 having a pair of symmetrical hollow curved-top housings 2 and 3, one being erected at each end of and integral with the base 1. A generally semicylindrical cover 4 covers the space between the housings 2 and 3. Meat to be tenderized is inserted through a slot 5 in the cover 4 and after being tenderized drops down onto the lower portion of an inclined tray 6.

Meat that is dropped through the slot 5 is guided between a rear comb 7 and a front comb 8 into the path of cutting teeth 9 forming the peripheries of a plurality of circular knives 10. The knives 10 are mounted on a pair of arbors 11 and 12 and are spaced along the arbors by a plurality of spacers 13.

One end of each of the arbors 11 and 12 is provided with a hexagonal portion 14. The hexagonal portions 14 of the arbors 11 and 12 fit into mating sockets 15 and 16 formed in the ends of a pair of stub shafts 17 and 18 which are journaled in sleeves 19 and 20 fitted in bores extending through a thick portion of the inner wall 21 of the hollow housing 3. The bearing sleeves 19 and 20 are locked in position by setscrews 22. The portion of the stub shaft 17 extending within the housing 3 carries a small gear 23 and a large gear 24. The small gear 23 meshes with an equal diameter gear 25 carried on the end of the stub shaft 18.

The other ends of the arbors 11 and 12 are necked down to form journals 26 and 27. The journals 26 and 27 fit into bushings 28 and 29 which are pressed into a pair of cylindrical sleeves 30 and 31. The sleeves 30 and 31 are slidably mounted in holes bored through side walls 32 and 33 of the hollow housing 2. The wall 32 is of substantial thickness so that the sleeves 30 and 31 may have considerable axial motion without sliding out of the holes through the wall 32. Milled flats 34 and 35 extending part way along the sides of the sleeves 30 and 31 cooperate with a flat plate 36 screwed to the outside wall 33 of the housing 2 to allow limited axial motion of the sleeves. The flats 34 and 35 terminate in deeper notches 37 and 38, which are slightly wider than the thickness of the plate 36. The sleeves are locked in position by slight rotary movements which cause the edges of the plate 36 to enter the notches 37 and 38.

When the sleeves 30 and 31 are locked in position the ends of the necked down portions 26 and 27 of the arbors 11 and 12 contact thrust washers 39 and 40 pressed into the bushings 28 and 29. The thrust washers 39 and 40 are backed up by screws 41 and 42 threaded into the bottom of the bores in which the bushings 28 and 29 are pressed. Holes through the thrust washers permit the insertion of a screw driver to adjust the position of the screws 41 and 42 and thus the position of the thrust washers 39 and 40.

The knife-carrying arbors 11 and 12 may be removed from the machine for cleaning by withdrawing the sleeves 30 and 31 to their outer limit of travel thereby allowing the hexagonal end portions 14 of the arbors to be withdrawn from the sockets 15 and 16 and the arbors to be lifted clear of the machine.

The ends of the combs 7 and 8 which guide the meat to the knives 10 are supported in notches cut in a pair of brackets 43 and 44 clamped to the housing walls 21 and 32. The walls 21 and 32 are provided with horizontal slots 45 and 46 of such length and width that plates 47 tapped to receive screws 48 may be inserted therethrough. The comb supporting brackets 43 and 44 near their upper edge are provided with countersunk holes to receive the heads of the screws 48. The brackets 43 and 44 are assembled in the frame by inserting the screws through the brackets and starting them into the plates 47. The plates 47 are then inserted through the slots 46 and the brackets are manually held in place while the screws 48 are tightened. The length and width of the slots 45 and 46 permit horizontal and vertical adjustment of the brackets 43 and 44 so that the combs 7 and 8 may be properly positioned with respect to the knife-carrying arbors. This type of construction ensures that there are no inaccessible surfaces, crevices or fissures which are liable to be contacted by the meat during its passage through the machine. Those surfaces which are exposed to the meat are smooth and may be readily cleaned.

The rear comb 7 is positioned so that its straight teeth slope generally forward and passing between the knives 10 lie tangent to the spacers 13 on the arbor 11. The forward slope of the rear comb 7 is sufficient to form an obtuse angle between its teeth and the plane through the axes of the arbors 11 and 12. The teeth of the front comb 8 extend vertically downward between the knives 10 on the arbor 12 until they are tangent to the spacers positioned on that arbor. From the point of tangency the teeth of the front comb 8 curve forward in a smooth curve until their generally horizontal end portions pass the peripheries of the knives slightly forward of a vertical plane through the axis of the arbor 12. In this construction, as the meat is fed between the knives, the knives cut part way through from each side thus severing the sinews of the meat to render it more palatable. Because of the forward slope of the rear comb 7 the meat is pushed forward onto the knives carried on the front arbor 12 as the teeth of the knives carried on the rear arbor pull out of the meat. The meat then follows the knives on the front arbor and is stripped from these knives as they pass the lowest point of their path. Because of the generally horizontal forward motion of the meat when it is finally stripped from the knives, it is projected into the open space near the opening between the cover 4 and the sloping tray 6. If desired, the operator may catch the meat before it strikes the tray 6 without any danger of cutting his fingers on the knives.

In addition to the advantage of projecting the meat forward, the particular arrangement of the combs facilitates the stripping of the meat from the knives. At no point in the process is there any tendency to simultaneously strip from both sets of knives. The meat is never put in tension. Therefore, small pieces which might otherwise be drawn free and lodge on the combs are left pressed against the main piece of meat.

The large gear 24 which drives the rear arbor 11 meshes with and is driven by a pinion 49 cut in the end of a main shaft 50. The main shaft 50 is journaled in bearing sleeves 51 mounted in transverse holes drilled through a pair of lugs 52 depending from the mid portion of the inner walls 21 and 32 of the hollow housings 2 and 3. On its end opposite the pinion 49 and within the hollow housing 2 the main shaft 50 is fitted with a pulley 53 which carries a V-belt 54 running over another pulley 55 mounted on a shaft 56 extending from an electric motor 57. The motor 57 is mounted on a curved plate 58 one end of which is fitted over a hinge pin 59. Steel strips 60, bent around the ends of the hinge pin 59, are bolted to the underside of ears 61 projecting inwardly from a wall 62 which forms the back of the frame 1. The other end of the curved plate 58 is drilled and is also given a single corrugation 63 extending substantially parallel to the shaft of the motor 57. The corrugation 63 engages the underside of a collar 64 formed integrally with a stud 65. A compression spring 66 held circumjacently mounted on the lower end of the stud 65 by a nut 67 supports the plate 58 with the corrugation 63 in contact with the collar 64. The stud 65 is threaded through an ear 68 projecting inwardly from a wall 69 forming the front side of the base 1. The spring 66 is compressed until, with the proper belt tension, the corrugation 63 barely contacts the collar 64. Field adjustment of belt tension to compensate for wear is made by screwing the stud 65 downwardly until the collar 64 barely engages the corrugation 63. The tension on the spring 66 is not adjusted in that it serves as a criteria of correct belt tension. This materially simplifies servicing of the machine in that no judgment as to correct belt tension is left to the operator or service man. As wear occurs the motor sinks thus compressing the spring 66 and partially relieving the belt tension. When this condition is noticed it is corrected by screwing the stud 65 downwardly thus relieving the compression of the spring 66 to its normal value and restoring normal belt tension.

The motor 57 may be swung out of the housing for servicing by first removing a plate 70 which closes the bottom of the housing, then screwing the stud 65 upwardly to allow the belt 54 to be removed and then screwing the stud downwardly out of the ear 68 thus allowing the motor 57 to swing on the hinge pin 59 to a position outside of the bottom of the housing. Electrical power is fed to the motor 57 through a switch 71 mounted through the back wall of a recess 72 in the lower portion of the end wall of the end housing 2 such that its operating handle 73 lies completely within the recess 72. With the switch mounted in this way it is practically impossible to accidentally start the motor.

The inner walls 21 and 32 of the housings 2 and 3 are provided with ledges 74 and 75 sloping from the back of the machine downwardly toward the front. These ledges provide ample support for the tray 6 and yet are narrow enough so that when the combs 7 and 8, the knife-carrying arbors 11 and 12 and the tray 6 are removed from the machine, access may be easily had to the interior of the housing.

The cover 4 is carried on a hinge 76 extending across the back of the machine at the top of the rear wall 62. Being hinged along this line the cover may be easily swung up and back to expose the knife-carrying arbors and combs. The ends and the front edge of the cover are formed with a turned in edge or bead 77 adapted to contact the housings 2 and 3 and give the housing a finished appearance. Just above the hinge 76 the cover is further provided with a narrow rib 78. When the cover is closed the rib 78 fits over a hooked end portion 79 of the tray 6 to hold it in place.

In the preferred form a curved front comb such as is shown in Figure III is used to strip the meat from the knives of the front arbor. The curve causes the portions of the comb teeth doing the final stripping to lie nearly perpendicular to the leading edge of the teeth of the knives and thus cause the meat to be cleanly stripped without allowing the knives to hook the sinews of the meat and to pull the meat through the combs. In the event that it is desired to strip the meat from the front knives in a downwardly direction with a straight comb the teeth of the knives must be raked backwards to achieve clean stripping. In Figure IX such a modified form of knife tooth is illustrated. In this structure a front comb 80 extends vertically downward until it contacts spacers 81 on an arbor 82. After passing tangent to the spacers 81 the teeth of the comb 80 are bent forward until they lie parallel to the teeth of a cooperating rear comb 83. Meat cutting knives 84 carried on the arbors 82 have teeth 85 whose leading edges 86 are substantially arcs of circles whose centers lie on a circle within the root circle of the teeth, the root circle being a circle drawn through the base of the teeth. When the leading edges of the teeth are curved backward in this form there is little or no tendency for the teeth to hook the sinews and thus pull the meat into and through the combs.

Having described the invention, I claim:

1. In a device for tenderizing meat, in combination, a cast unitary housing comprising a pair of hollow tower portions forming the ends, said tower portions being joined by a low front wall and a higher rear wall, ledges on the opposed faces of said towers extending downwardly from the top of the rear wall to the top of the front wall, a removable tray carried on said ledges, a motor in the space between said walls and under said tray mounted on a hinge allowing it to swing from an operating position within said housing to an accessible position exterior of said housing, bearings in said towers, a pair of knife-carrying arbors in the space between said towers carried by said bearings, and drive means between said arbors and said motor including gears in one of said towers and a belt from the motor to a pulley in the other of said towers.

2. In a device of the class described, in combination, a generally U-shaped unitary housing the upstanding ends of which are each formed of spaced apart walls, a pair of knife-carrying arbors spanning the space between said ends, socket ended shafts journaled in one wall of one upstanding end for supporting and driving said arbors, axially slidable sleeves extending through both walls of the other upstanding end for journaling the free ends of said arbors, said sleeves being provided with surfaces cooperating with a member fixed to one of said walls to permit limited axial movement of said sleeves for removal of said arbors and to lock said sleeves in supporting engagement with said arbors, a removable tray beneath said arbors, a main shaft supported by said inner walls beneath said tray, gears located between the walls of one upstanding end for driving said socket shafts from said main shaft, a motor mounted in the housing beneath said tray and a belt drive in the end opposite the gears for driving said main shaft from said motor.

3. A device for tenderizing meat, in combination, a unitary frame comprising a pair of open bottomed housings held in spaced relation by a low front wall and a higher rear wall, a removable tray mounted between said housings and inclined from the top of said rear wall to the top of said front wall, a pair of knife-carrying arbors journaled in said housings and spanning the space between said housings, a main shaft extending between said housings below said tray, a motor mounted in said frame below said tray, gearing in one of said housings operatively connecting said main shaft to said arbors and a belt and pulleys in the other of said housings for connecting said motor to said main shaft.

4. In a device for tenderizing meat, in combination, a unitary frame comprising a pair of open bottomed housings held in spaced relation by a low front wall and a higher rear wall, a removable tray extending from housing to housing and from the top of the rear wall to the top of the front wall, a motor hingedly mounted to one of said walls and adapted to swing from an operative position within said frame to an accessible servicing position outside said frame, a main shaft extending between said housings under said tray, pulleys and a belt operatively connecting said motor and said shaft, a spring circumjacently mounted on a stud depending from the other of said walls for supporting the excess of the weight of said motor over that required for suitable belt tension, a pair of knife-carrying arbors in the space between said housings above said tray, shafts journaled in the adjacent wall of one of the housings drivingly supporting one end of each arbor, sleeves extending through both walls of the other of said housings for journaling the other end of each arbor, means for retaining said sleeves, adjustable thrust bearings in said sleeves, and gearing between said main shaft and said shafts.

5. In a device for tenderizing meat, in combination, a frame comprising a pair of hollow upstanding end housings held in spaced relation by a front wall and a rear wall, each of said housings in its wall facing the other housing being provided near its top with a generally horizontal slot, and near its lower midportion with a single bearing and a pair of bearings intermediate said slot and said single bearing, a pair of knife-carrying arbors supported from said pairs of bearings, combs having teeth interspersed between the knives on said arbors, brackets for holding said combs, said brackets having portions insertable through said slots, a main shaft journaled in said single bearings, mechanism in one of said housings for operatively connecting said arbors and said main shaft, a motor mounted between said walls and below said main shaft and means in the other of said housings operatively connecting said motor to said main shaft.

6. In a device for tenderizing meat, in combination, a cast unitary frame comprising a pair of hollow housings forming the ends, and a low front wall and higher rear wall for holding said housings in spaced relation, a pair of knife-carrying arbors, bearings in each of said housings for supporting said arbors, a motor positioned in the space between said walls, and a force transmission system from said motor to said arbors including a belt and pulley in one of said housings, a main shaft between said housings and gearing in the other of said housings operatively connecting said main shaft and said arbors.

7. In a device for tenderizing meat, in combination, a unitary frame comprising a pair of hollow housings held in spaced relation by a low front wall and a high rear wall, a pair of knife-carrying arbors spanning the space between said housings, a main shaft journaled in bearings in the inner walls of said housings and extending therebetween, its ends terminating substantially within said hollow housings, a pulley on one end of said shaft and a pinion on the other end of said shaft, a motor belted to said pulley and gearing meshed with said pinion for driving said arbors.

GRANT M. RICHARD.

REFERENCES CITED

The following references are of record in the file of this patent:

UNITED STATES PATENTS

| Number | Name | Date |
|---|---|---|
| 1,484,402 | Martin | Feb. 19, 1924 |
| 2,116,532 | McCabe | May 10, 1938 |
| 2,126,554 | Hoy et al. | Aug. 9, 1938 |
| 2,151,113 | Jacobi | Mar. 21, 1939 |
| 2,241,650 | Spang | May 13, 1941 |
| 2,287,278 | Spang | June 23, 1942 |
| 2,360,728 | Spang | Oct. 17, 1944 |
| 2,364,533 | Jackson | Dec. 5, 1944 |
| 2,409,463 | Ahrndt | Oct. 15, 1946 |

---

Certificate of Correction

Patent No. 2,450,688.

October 5, 1948.

GRANT M. RICHARD

It is hereby certified that error appears in the printed specification of the above numbered patent requiring correction as follows:

Column 6, line 21, claim 3, for "3. A device" read *3. In a device*;

and that the said Letters Patent should be read with this correction therein that the same may conform to the record of the case in the Patent Office.

Signed and sealed this 4th day of January, A. D. 1949.

[SEAL]

THOMAS F. MURPHY,
*Assistant Commissioner of Patents.* shaft journaled in said single bearings, mechanism in one of said housings for operatively connecting said arbors and said main shaft, a motor mounted between said walls and below said main shaft and means in the other of said housings operatively connecting said motor to said main shaft.

6. In a device for tenderizing meat, in combination, a cast unitary frame comprising a pair of hollow housings forming the ends, and a low front wall and higher rear wall for holding said housings in spaced relation, a pair of knife-carrying arbors, bearings in each of said housings for supporting said arbors, a motor positioned in the space between said walls, and a force transmission system from said motor to said arbors including a belt and pulley in one of said housings, a main shaft between said housings and gearing in the other of said housings operatively connecting said main shaft and said arbors.

7. In a device for tenderizing meat, in combination, a unitary frame comprising a pair of hollow housings held in spaced relation by a low front wall and a high rear wall, a pair of knife-carrying arbors spanning the space between said housings, a main shaft journaled in bearings in the inner walls of said housings and extending therebetween, its ends terminating substantially within said hollow housings, a pulley on one end of said shaft and a pinion on the other end of said shaft, a motor belted to said pulley and gearing meshed with said pinion for driving said arbors.

GRANT M. RICHARD.

REFERENCES CITED

The following references are of record in the file of this patent:

UNITED STATES PATENTS

| Number | Name | Date |
| --- | --- | --- |
| 1,484,402 | Martin | Feb. 19, 1924 |
| 2,116,532 | McCabe | May 10, 1938 |
| 2,126,554 | Hoy et al. | Aug. 9, 1938 |
| 2,151,113 | Jacobi | Mar. 21, 1939 |
| 2,241,650 | Spang | May 13, 1941 |
| 2,287,278 | Spang | June 23, 1942 |
| 2,360,728 | Spang | Oct. 17, 1944 |
| 2,364,533 | Jackson | Dec. 5, 1944 |
| 2,409,463 | Ahrndt | Oct. 15, 1946 |

Certificate of Correction

Patent No. 2,450,688. October 5, 1948.

GRANT M. RICHARD

It is hereby certified that error appears in the printed specification of the above numbered patent requiring correction as follows:

Column 6, line 21, claim 3, for "3. A device" read *3. In a device*;

and that the said Letters Patent should be read with this correction therein that the same may conform to the record of the case in the Patent Office.

Signed and sealed this 4th day of January, A. D. 1949.

[SEAL]

THOMAS F. MURPHY,
*Assistant Commissioner of Patents.*